(12) United States Patent
Mian et al.

(10) Patent No.: US 8,006,559 B2
(45) Date of Patent: Aug. 30, 2011

(54) WAYSIDE ROLLING STOCK INSPECTION

(75) Inventors: Zahid F. Mian, Loudonville, NY (US); Jeremy C. Mullaney, Troy, NY (US)

(73) Assignee: International Electronic Machines Corporation, Albany, NY (US)

( * ) Notice: Subject to any disclaimer, the term of this patent is extended or adjusted under 35 U.S.C. 154(b) by 440 days.

(21) Appl. No.: 12/195,022

(22) Filed: Aug. 20, 2008

(65) Prior Publication Data

US 2009/0049936 A1     Feb. 26, 2009

Related U.S. Application Data

(60) Provisional application No. 60/935,574, filed on Aug. 20, 2007.

(51) Int. Cl.
    *G01N 29/27* (2006.01)
(52) U.S. Cl. ............ 73/643; 250/522.1; 702/39; 702/40
(58) Field of Classification Search .................... 73/636, 73/632, 644, 643; 250/491.1, 522.1; 356/600, 356/237.1; 702/38, 39, 40
    See application file for complete search history.

(56) References Cited

U.S. PATENT DOCUMENTS

| | | | |
|---|---|---|---|
| 3,234,501 A * | 2/1966 | Hagen et al. ................... | 367/191 |
| 3,731,087 A | 5/1973 | King | |
| 4,674,718 A | 6/1987 | Bjorklund | |
| 4,695,017 A | 9/1987 | Ringer et al. | |
| 4,749,870 A | 6/1988 | Schmalfuss et al. | |
| 4,904,939 A | 2/1990 | Mian | |
| 5,397,900 A * | 3/1995 | Wetzler ........................ | 250/342 |
| 5,636,026 A | 6/1997 | Mian et al. | |
| 5,702,074 A | 12/1997 | Paterick-Smith et al. | |
| 6,523,411 B1 | 2/2003 | Mian et al. | |
| 6,768,551 B2 | 7/2004 | Mian et al. | |
| 2003/0072001 A1 | 4/2003 | Mian et al. | |
| 2005/0258943 A1 | 11/2005 | Mian et al. | |
| 2005/0267707 A1 | 12/2005 | Mian et al. | |
| 2006/0131464 A1* | 6/2006 | Hesser et al. ............. | 246/169 D |

\* cited by examiner

*Primary Examiner* — Hezron Williams
*Assistant Examiner* — Rose M Miller
(74) *Attorney, Agent, or Firm* — John W. LaBatt; Hoffman Warnick LLC

(57) ABSTRACT

Inspection of rolling stock (e.g., rail vehicles) traveling along a set of rails is performed using devices that are placed in a housing that is attached to the set of rails. The housing conforms to standard width, height, and load bearing requirements for a railroad tie. As such, the housing can be readily installed and allows for the continued use of standard railroad maintenance equipment. One or more sensing devices are attached to the housing and acquire evaluation data on component(s) of the rail vehicle, such as the wheels. A computing device can evaluate a condition of the component(s) using the evaluation data.

20 Claims, 7 Drawing Sheets

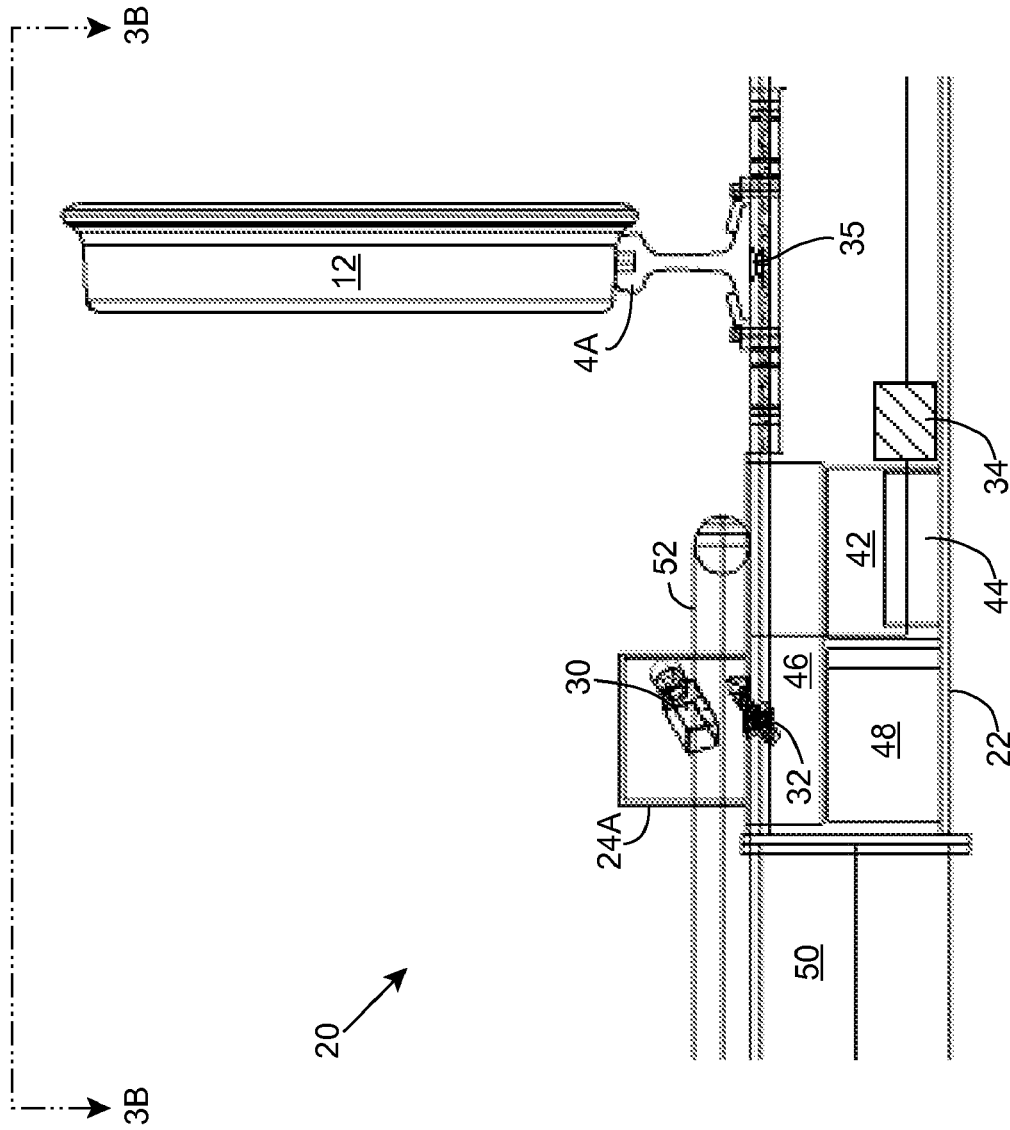

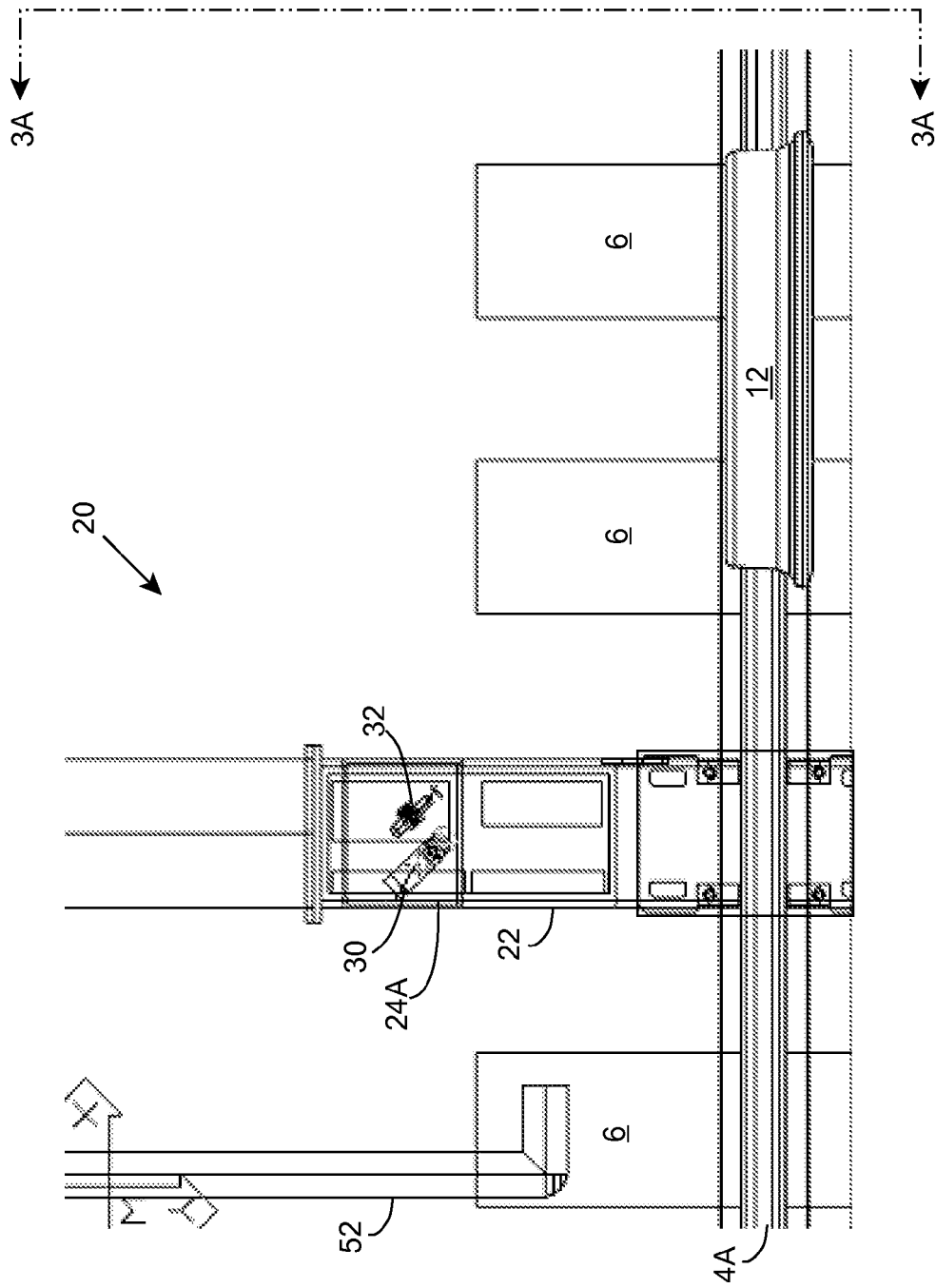

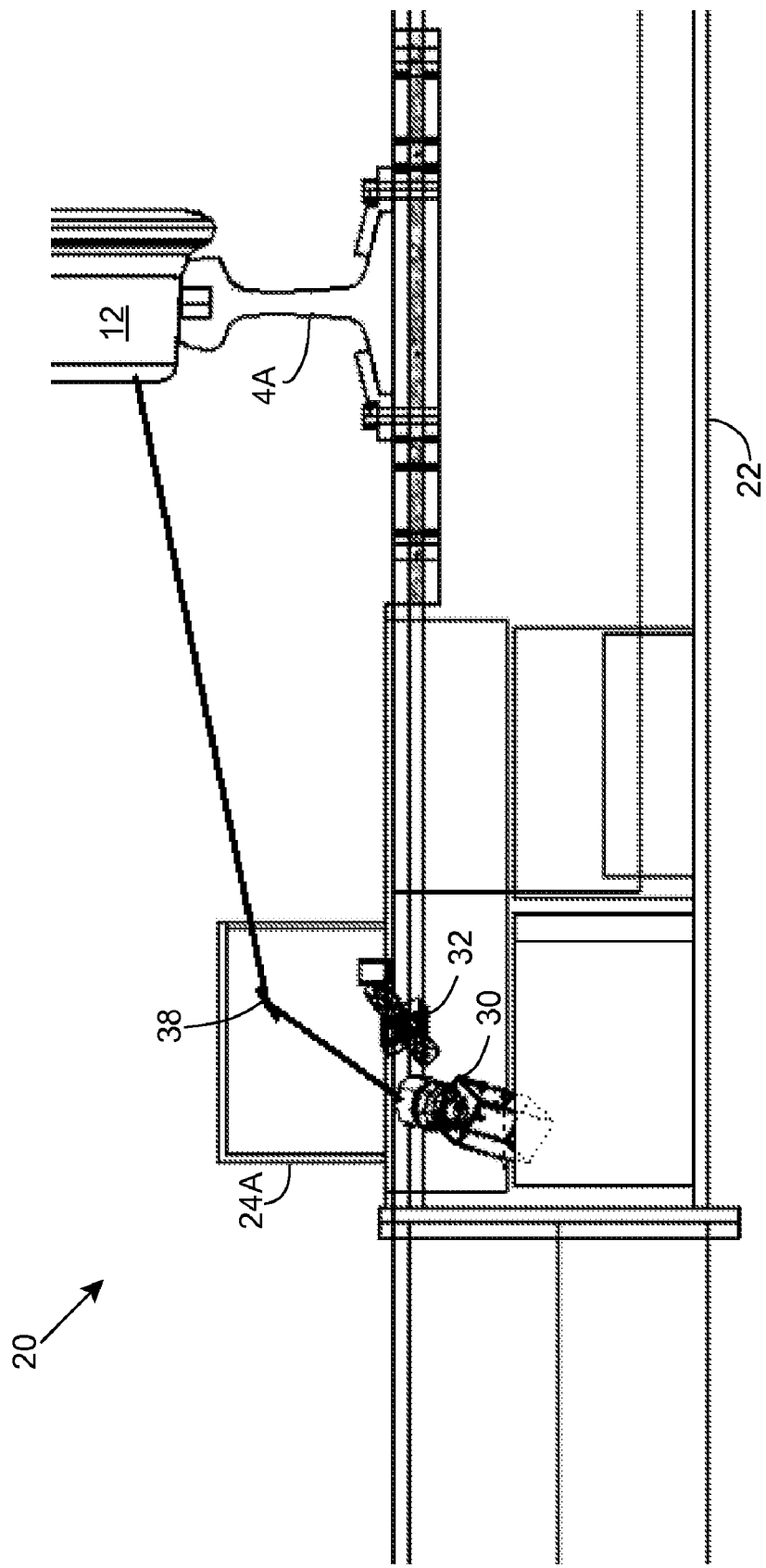

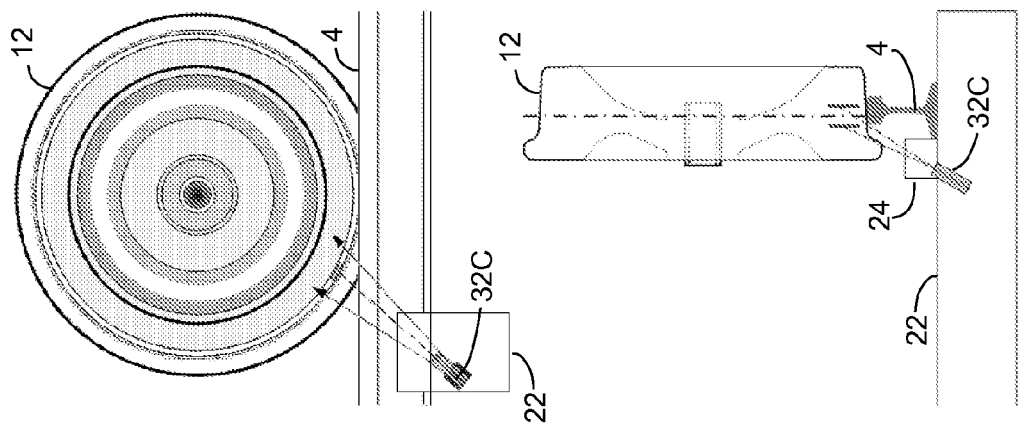
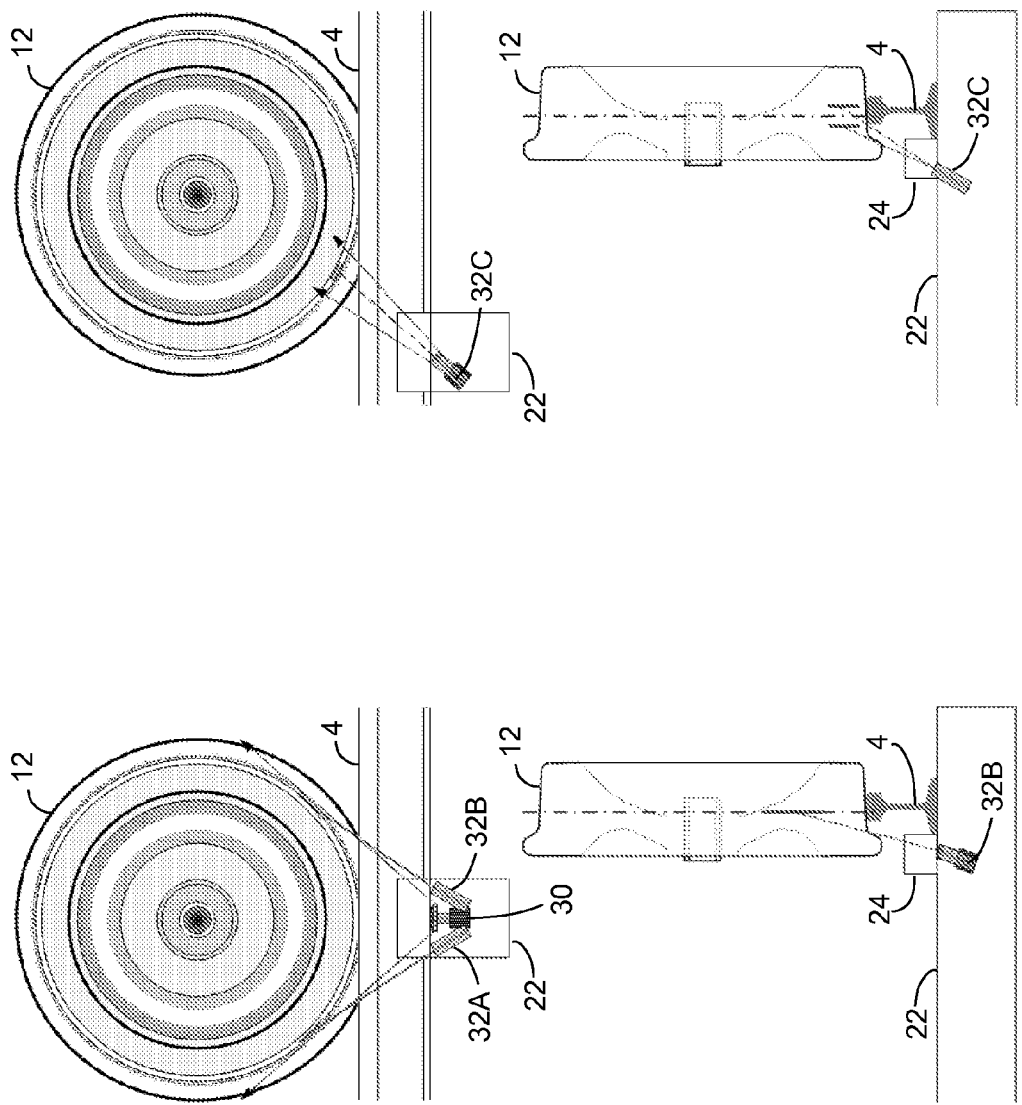

WAYSIDE ROLLING STOCK INSPECTION

REFERENCE TO PRIOR APPLICATIONS

The current application claims the benefit of co-pending U.S. Provisional Application No. 60/935,574, titled "System, device and method for wayside rolling stock inspection", which was filed on 20 Aug. 2007, and which is hereby incorporated by reference.

TECHNICAL FIELD

The disclosure relates generally to railroad inspection, and more particularly, to inspecting various components of rolling stock.

BACKGROUND ART

FIG. 1 shows an overview of a railroad 2 according to the prior art. In general, railroad 2 includes two parallel rails 4 (only one shown) that are periodically fastened to support rail support members (ties) 6. Ties 6 are generally embedded in a matrix of gravel, stone, and dirt called ballast 8. A rail vehicle 10 (e.g., locomotive, railroad car, wagon, coach, and/or the like) includes wheels 12 that travel along rails 4. Wheels 12 are attached to the rail vehicle 10 by a complex support and control mechanism, which is generally referred to as a truck 14. Truck 14 can include springs 16 and other components for reducing transmitted vibration and shock, a mechanism for braking the rail vehicle 10, mechanisms for coupling rail vehicle 10 to other rail vehicles, and/or the like. Rail vehicle 10, along with its truck 14, accompanying control systems (e.g., air, electrical, hydraulic, and/or the like), engine (e.g., for a locomotive), wheels 12, and/or the like, is referred to as the "rolling stock" of railroad 2. Multiple rail vehicles 10 that are coupled together are often referred to as a consist of rolling stock.

During operation, many aspects of the rolling stock are exposed to various forms of stress, which may cause wear and tear, and, without maintenance, eventual failure. To this extent, various aspects of the rolling stock can be examined for safety and maintenance purposes. For example, wheels 12, due to their constant rolling in contact with rails 4, can and do experience wear in various ways depending on the exact loading of the wheels 12 and rail 4. Over time, wheels 12 will eventually become overly worn, develop cracks or gouges, and/or the like, and can become unsafe for use as a result. Further, vibration and shock during use can cause truck 14 to crack. Still further, braking and other mechanisms will experience wear as a result of their operation.

In light of the above, it is necessary to inspect the various components of railroad 2 to ensure that worn components are refurbished or replaced before their wear becomes a danger. Given the vast scope of the railroad industry, this is a formidable undertaking and one in which a great deal of time and money has been invested. Inspections are often manually performed by an inspector, who may use one or more devices for obtaining accurate measurements of a particular railroad 2 component. For example, wheels 12 are regularly inspected using various devices, such as a mechanical caliper, a handheld electronic device (e.g., as described in U.S. Pat. No. 4,904,939), and/or the like. However, these manual inspections require that the rolling stock be stopped during the inspection and a manual measurement be performed, which costs a considerable amount of time.

Wayside systems have been proposed to automate the inspection of certain components of the rolling stock. Often, these systems have some or all of their components set into the ground to obtain placement close to tracks 4 and ties 6, while avoiding collision with a component of the rolling stock. Illustrative wayside systems include: a hot bearing detector (e.g., as described in U.S. Pat. No. 3,731,087); image-based wheel measurement systems (e.g., as described in U.S. Pat. Nos. 4,749,870, 5,636,026, 6,768,551); and an interior wheel 12 flaw detection system (e.g., as described in U.S. Pat. No. 6,523,411).

Current wayside systems can be difficult to align and calibrate multiple disparate components of the system so that accurate results are provided during operation. Further, in certain environments, the wayside systems often require weatherization, cleaning mechanisms, and the like, which add to the cost of implementing the systems and the complexity of designing and maintaining the systems. Still further, the wayside systems may interfere with standard railroad operation. For example, an automated system for maintaining tracks 4 and ties 6 is often used, which examines the spacing and set of ties 6 and will re-tamp a tie 6 into the ballast 8 when required. Such a system relies on precise limits for the size and spacing of ties 6, which may be altered to accommodate a wayside system. As a result, the automated track maintenance system may not be useable for the section of rail. Still further, a wayside system may interfere with track inspection and maintenance, which can result in damage or impedance to a maintenance machine or damage to the wayside system.

Additionally, railway switches, i.e., sections of moveable track that are used to selectively direct rolling stock along one of a plurality of possible tracks, may freeze or become jammed with snow. The failure of a switch to move or move its full distance can lead to a derailment or a collision. As a result, it is critical to ensure the proper movement of the switches. Several systems have been proposed including those described in U.S. Pat. Nos. 5,702,074, 4,674,718, and 4,695,017. Each of these systems vent heated air at particular locations along the track. One system pipes air through a conduit that comprises substantially the same size, shape, and support capability as that of a railroad tie 6.

SUMMARY OF THE INVENTION

The inventors recognize that the current state of the art can be improved. For example, current wayside systems do not inspect all components of rolling stock that are susceptible to wayside inspection. Further, no current solution determines whether there may be a correspondence between the operable status of the various disparate components being inspected. For example, no solution enables an examination of the data acquired by various wayside systems to evaluate whether there is a correlation between rail vehicles 10 that show overheating bearings and those that show increased wear in the trucks 14.

Aspects of the invention provide a solution for inspecting rolling stock (e.g., rail vehicles) traveling along a set of rails using devices that are placed in a housing that is attached to the set of rails. The housing conforms to standard width, height, and load bearing requirements for a railroad tie. As such, the housing can be readily installed and allows for the continued use of standard railroad maintenance equipment. One or more sensing devices are attached to the housing and acquire evaluation data on component(s) of the rail vehicle, such as the wheels. A computing device can evaluate a condition of the component(s) using the evaluation data.

A first aspect of the invention provides a system for inspecting a component of a rail vehicle, the system comprising: a housing attached to a set of rails on which the rail vehicle is traveling, wherein the housing conforms to standard width, height, and load bearing requirements for a railroad tie; a set of sensing devices attached to the housing, each sensing device configured to acquire evaluation data on the component of the rail vehicle; and a computing device configured to evaluate a condition of the component using the evaluation data.

A second aspect of the invention provides a system for acquiring evaluation data on a component of a rail vehicle, the system comprising: a first housing attached to a set of rails on which the rail vehicle is traveling, wherein the first housing conforms to standard width, height, and load bearing requirements for a railroad tie; a sensing device attached to the first housing, the sensing device configured to acquire evaluation data on the component of the rail vehicle; a second housing attached to the set of rails, wherein the second housing conforms to standard width, height, and load bearing requirements for a railroad tie; and an emitting device attached to the second housing, wherein the emitting device is configured to emit radiation that is captured by the sensing device attached to the first housing.

A third aspect of the invention provides a system for inspecting a component of a rail vehicle, the system comprising: a first housing attached to a set of rails on which the rail vehicle is traveling, wherein the first housing conforms to standard width, height, and load bearing requirements for a railroad tie; a first bay attached to a top surface of the first housing, wherein the first bay includes an opening that faces one of the set of rails; and a first sensing device attached to at least one of: the first housing or the first bay using a means for isolating the first sensing device from vibration experienced by the first housing, the first sensing device configured to acquire evaluation data on the component of the rail vehicle based on radiation that passes through the opening on the first bay; a vibration sensing device located on the housing directly below one of the set of rails, and configured to acquire evaluation data on the component of the rail vehicle based on vibration caused by the rail vehicle; and a computing device configured to evaluate a condition of the component using the evaluation data acquired by the first sensing device and the vibration sensing device.

A fourth aspect of the invention provides a method of inspecting a component of a rail vehicle, the method comprising: attaching a housing to a set of rails on which the rail vehicle is traveling, wherein the housing conforms to standard width, height, and load bearing requirements for a railroad tie, wherein the housing includes: a bay attached to a top surface of the housing, wherein the bay includes an opening that faces one of the set of rails; and a sensing device attached to at least one of: the housing or the bay, wherein the sensing device is configured to acquire evaluation data on the component of the rail vehicle based on radiation that passes through the opening on the first bay; acquiring evaluation data on the component as the rail vehicle passes the housing; and evaluating a condition of the component using the evaluation data.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 3A-B show two views of an illustrative housing for a wayside inspection system according to an embodiment.

FIG. 4 shows a side view of another illustrative housing for a wayside inspection system according to an embodiment.

FIGS. 5A-B show side and front views of illustrative alternative configurations for measuring a diameter of a wheel according to embodiments of the invention.

It is noted that the drawings are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for inspecting rolling stock (e.g., rail vehicles) traveling along a set of rails using devices that are placed in a housing that is attached to the set of rails. The housing conforms to standard width, height, and load bearing requirements for a railroad tie. As such, the housing can be readily installed and allows for the continued use of standard railroad maintenance equipment. One or more sensing devices are attached to the housing and acquire evaluation data on component(s) of the rail vehicle, such as the wheels. A computing device can evaluate a condition of the component(s) using the evaluation data. As used herein, unless otherwise noted, the term "set" means one or more (i.e., at least one) and the phrase "any solution" means any now known or later developed solution.

Figure 1:
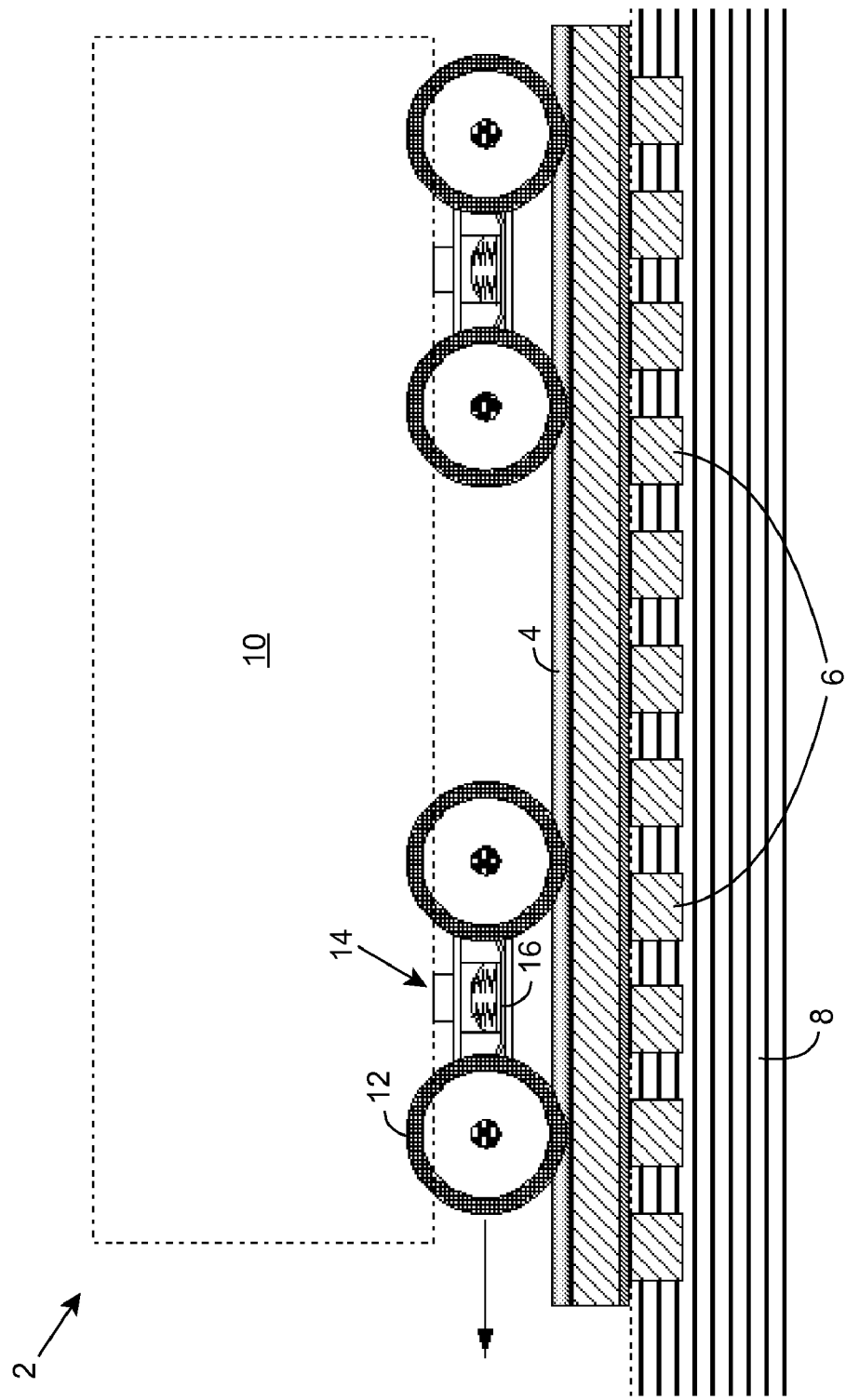
FIG. 1 shows an overview of a railroad according to the prior art.
Figure 2:
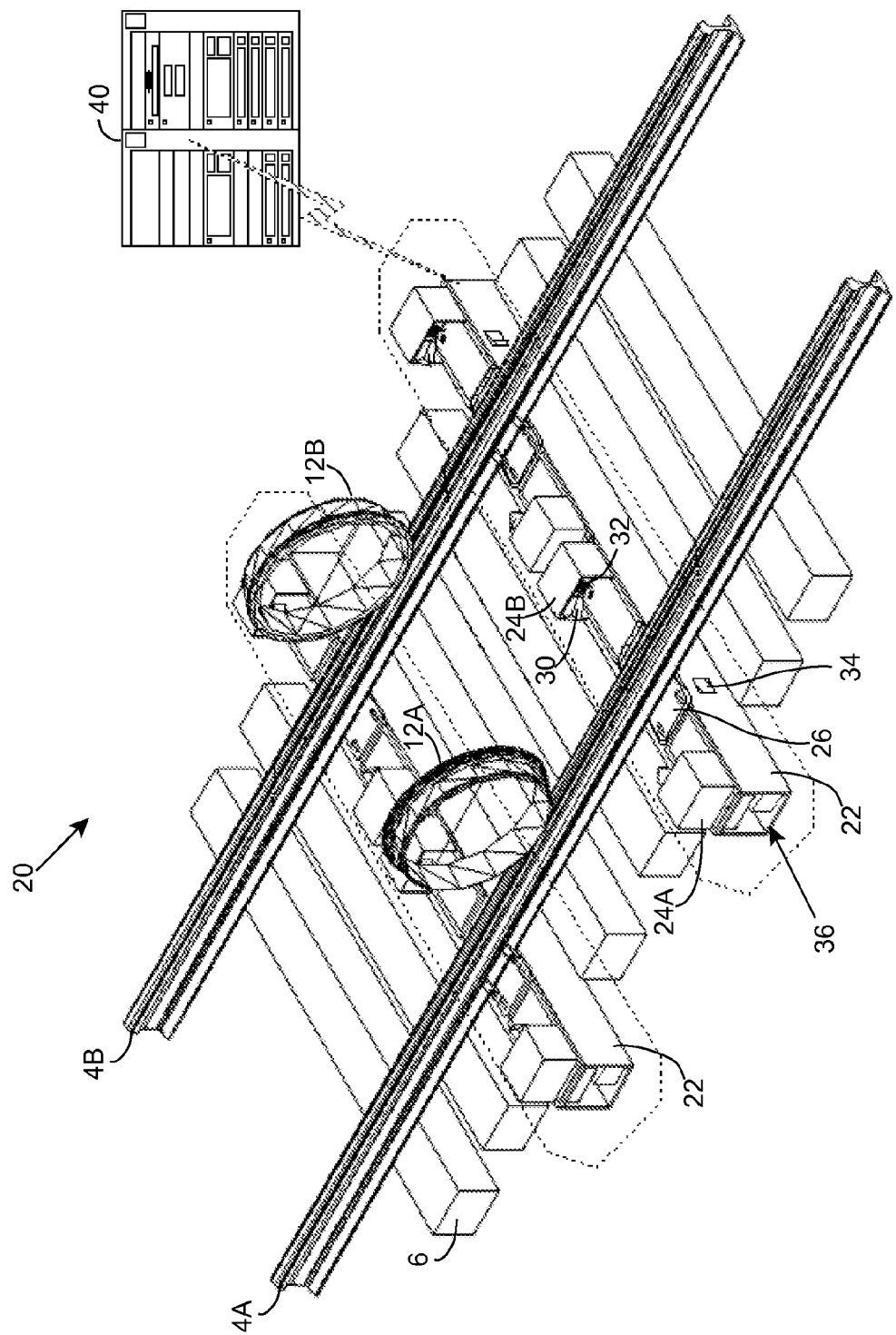
FIG. 2 shows an overview of an illustrative wayside inspection system according to an embodiment.

Turning to the drawings, FIG. 2 shows an overview of an illustrative wayside inspection system 20 according to an embodiment. System 20 includes a set of inspection housings 22 that conform in at least some critical particulars with the regulated and permitted dimensions (e.g., height, width) and support capabilities of a railroad tie 6, which allows the standard tie 6 and ballast 8 (FIG. 1) tamper methods to continue to be used on ties 6. Further, housing 22 can be installed in a manner that is substantially similar to the installation of a new tie 6, and can replace a standard tie 6 without affecting the spacing of the ties 6. As illustrated, housing 22 replaces a standard tie 6 in a series of ties 6 and conforms to width (e.g., approximately 9"), height (e.g., approximately 7"), and load bearing requirements (e.g., that of oak, hickory, or other hardwood of similar dimensions) for a tie 6. In an embodiment, housing 22 is manufactured using steel, although housing 22 could be manufactured using other types of materials, such as various composite materials that are currently used in aircraft, and which possess great strength in low-bulk, low-weight packages. Further, housing 22 can comprise symmetrically similar equipment that performs similar actions with respect to passing component(s) of rolling stock (e.g., wheels 12A-B) on each track 4A-B. Alternatively, a housing 22 can include different equipment for each track 4A-B. In an embodiment, multiple housings 22 can replace multiple ties 6 to form wayside inspection system 20. In this case, a housing 22 can include similar devices as another housing and/or a housing 22 may include different device(s) from other housing(s) in system 20.

A set of housings 22 can be installed on any type of tracks 4A-B. When multiple housings 22 are installed, the housings can be adjacent to one another and/or include one or more ties 6 there between. Regardless, the standard tie 6 spacing (e.g., approximately every two feet) can be used between adjacent housings 22 and between a housing 22 and a tie 6. In an embodiment, tracks 4A-B are along a main rail line on which trains are traveling at speeds of 20-50 mile per hour. In this case, housing 22 enables little down time for the maintenance of the main line by enabling standard automated maintenance machinery to continue to be utilized on tracks 4A-B. For example, such machinery may temporarily lift a tie 6 together with tracks 4A-B, adjust the ballast 8 (FIG. 1), replace the tie 6 and tracks 4A-B, and tamp the ballast 8. Housing 22 can be configured to enable the machinery to perform the same operations on housing 22 in an automated manner. Further, housing 22 could be installed at a classification yard, on which trains are traveling at much slower speeds. Still further, housing 22 could be installed in a maintenance facility in which the rolling stock may only comprise a truck 14 (FIG. 1) or a portion thereof (e.g., a single axle).

Regardless, each housing 22 may vary from a railroad tie 6 in one or more dimensions that, in an embodiment, do not interfere with the spacing of ties 6 and housing 22 and the standard track maintenance procedures and equipment for rails 4A-B and ties 6. For example, housing 22 can be longer than a standard tie 6. Additionally, depending on the inspection component(s) utilized, one or more bays 24A-B may be placed on housing 22. Each bay 24A-B can comprise an opening or window through which one or more characteristics of a set of components (e.g., wheels 12A-B, axles, trucks 14 (FIG. 1), and/or the like) on the rolling stock can be sensed and/or an emission can be sent (e.g., laser lines) to impede component(s) of the rolling stock to assist in the evaluation process. For example, housing 22 can include a bay 24A on the exterior of rails 4A-B and a bay on the interior of rails 4A-B, which enable the acquisition of data on the exterior and interior sides of component(s) of the rolling stock. For a pair of rails 4A-B, housing 22 can include a pair of bays 24A-B for each rail 4A-B as illustrated.

Further, at least a portion of each housing 22 includes a hollow interior that, together with bays 24A-B (when included), is configured to contain and provide a protective support structure for inspection component(s). As discussed herein, the inspection component(s) can include various combinations of sensing, emitting, power, computing, communication, control, environmental, and/or the like, devices. Access to the hollow interior can be provided using any solution. For example, an end of housing 22 can be removed, a top surface of housing 22 can be removed/lifted, and/or the like. Once all component(s) are secured within housing 22, the interior can be sealed using any solution to protect the various components from exterior elements.

Housing 22 can be attached to rails 4A-B using any solution. In an embodiment, housing 22 using a similar connection mechanism 26 as is used for attaching ties 6 to rails 4A-B (e.g., tie plate). Further, in particular embodiments (e.g., when rolling stock is traveling at a relatively high rate of speed), the rolling stock may generate a significant amount of vibration and shock, which can cause maladjustment, damage, inactivation, or the like to one or more inspection components. To this extent, connection mechanism 26 can include one or more components that are configured to reduce the amount of vibration that occurs in housing 22 when rolling stock is moving along rails 4A-B. For example, a pad of a vibration-damping substance, such as a rubberized material, can be disposed between rails 4A-B and housing 22. Further, a set of mechanical and/or electrical shock absorbers could be utilized.

In general, system 20 includes one or more sensing devices 30 and/or one or more emitting devices 32. Each sensing device 30 can detect one or more characteristics of the rolling stock. For example, a sensing device 30 can comprise a high-speed visible-light and/or infrared imaging device that acquires one or more images for each wheel 12A-B that passes by the corresponding rail 4A-B. A sensing device 30 can work in conjunction with an emitting device 32, whose emission is reflected off of one or more components of the rolling stock and sensed by the sensing device 30. For example, an emitting device could generate visible light, laser lines, and/or the like, which can be imaged by a corresponding imaging device 30.

To this extent, FIGS. 3A-B show two views of an illustrative housing 22 for a wayside inspection system 20 according to an embodiment. As illustrated, housing 22 includes a bay 24A that contains an imaging device 30 and a laser line emitting device 32. In operation, as a wheel 12 on rolling stock travels along rail 4A, laser line emitting device 32 can emit a set of laser lines that impinge a surface of wheel 12. Imaging device 30 can capture images of wheel 12, which include the portion of wheel 12 that was impinged by the set of laser lines. The image data of wheel 12 can be processed to evaluate an operability of wheel 12 (e.g., to determine whether the dimensions of the wheel remain within specified limits as required by regulation and law). While only a single imaging device 30 and laser line emitting device 32 are shown, it is understood that multiple imaging devices 30 and/or laser line emitting devices 32 could be included in a single housing 22 and/or implemented in multiple housings 22 from which the image data is collected and processed to evaluate wheel 12 (or other component(s) of the rolling stock).

It is understood that laser line-based measurements of the surface of a component, such as wheel 12, require specific angles of view with respect to wheel 12 and the projected laser lines. In one embodiment, an angle between imaging device 30 and the laser lines is approximately fourteen degrees relative to the surface of a typical wheel 12. It is understood that the angle may be varied, but the minimum and maximum angles are bounded by the required accuracy of the application and by physical limitations. For example, in a two-dimensional imaging system, reducing the angle between the imaging device 30 and laser lines to zero will cause the system to be unable to discriminate between laser line distances if they are on the same plane of sight. Separation of the imaging devices 30 causes an apparent deformation of the line which can be registered by the imaging device 30 and used to calculate deviations from a standard surface contour. In an embodiment, a laser line emitting device 32 is placed in a first housing 22 and the corresponding imaging device 30 that images the laser lines is placed in a second housing 22 (e.g., adjacent to the first housing 22). To this extent, each housing 22 could comprise a laser line emitting device 32 and imaging device 30, in which each imaging device 30 is configured to image the laser lines that are projected by the laser line emitting device 32 in the other housing.

As illustrated in FIG. 3A, when a device, such as imaging device 30, is placed within bay 24A, the device is higher than the level of grade, including housing 22, ties 6 (FIG. 2), etc. As a result, bay 24A and any device(s) placed therein, have an increased possibility of being struck by equipment or other objects that are dragging or hanging from the rolling stock. To limit the damage to the devices of system 20, a sensor head portion of imaging device 30 can be placed within bay 24A, while the remainder of imaging device 30 is placed within housing 22. Further, FIG. 4 shows a side view of another illustrative housing 22 for a wayside inspection system 20 according to an embodiment. As illustrated, imaging device 30 is placed within housing 22 and a mirror 38 is placed within bay 24A. Imaging device 30 and mirror 38 are configured such that imaging device 30 will image radiation (e.g., light, infrared, ultraviolet, and/or the like) that is reflected off of the corresponding component of the rolling stock, such as wheel 12, in a desired location. While only a single mirror 38 is shown, it is understood that system 20 could implement any assembly including mirror(s), lense(s), and/or other devices to convey the radiation to imaging device 30. To this extent, in an embodiment, imaging device 30 can be placed further within housing 22 in order to provide further protection from dust and other debris that may enter through bay 24A and one or more additional mirrors 38 and/or lenses can be placed within bay 24A and/or housing 22 to direct the radiation to imaging device 30. Additionally, it is understood that a similar system of mirrors and/or lenses could be implemented to enable an emitting device 32, such as a laser line emitting device, to be placed further within housing 22.

However, it is understood that system 20 can include any combination of various types of sensing device(s) 30 and/or emitting device(s) 32, which can acquire data on the rolling stock using any solution. For example, sensing device(s) can include: an infrared camera, which can be utilized to detect an overheated component (e.g., slid wheel, stuck brake, etc.); an acoustic sensor, which can detect the vibration/sound signature of a failing bearing; and/or the like. Further, other types of sensors can be implemented, such as: infrared point sensors, line sensors, scanned sensors, or the like; sensing devices that utilize other forms of electromagnetic radiation, such as ultraviolet, magnetic fields, X-rays, etc.; sensing devices of a non-electromagnetic nature, such as an acoustic sensor, impact or pressure sensor, weight sensor, chemical sensor, biological sensor, and/or the like; etc. Additionally, when implemented in conjunction with an emitting device 32, it is understood that a sensing device 30 may be configured to detect radiation that passes through a component (e.g., wheel 12) rather than radiation that is reflected off of the component. The precise set of sensing device(s) 30 and/or emitting device (s) 32 selected are dependent on the data that is desired to be acquired and the corresponding evaluation to be performed, and can be selected using any solution. To this extent, various embodiments of system 20 can comprise one or more sensing device(s) 30 and/or emitting device(s) 32 as disclosed in: U.S. Pat. Nos. 5,636,026, 6,768,551, and 6,523,411, each of which is incorporated by reference; and U.S. Patent Application Publication No. 2003/0072001, which is also incorporated by reference.

Referring to FIGS. 2 and 3A-B, system 20 can include one or more additional sensing devices that sense various aspects of the operating environment for system 20. For example, system 20 can include sensing device(s) for detecting temperature, humidity, light, and/or the like. Further, system 20 can include a set of sensing devices 34 (e.g., accelerometer or strain gauge), each of which is configured to detect a side impact of force on housing 22. By measuring and evaluating the side impact, system 20 can detect a "hunting" truck 14 (FIG. 1) and other causes of side-to-side impacts/oscillation of a rail vehicle 10 (FIG. 1). Additionally, system 20 can include a set of sensing devices 35 (e.g., load cell or accelerometer) that are disposed between a rail 4A and housing 22, and can measure a magnitude and nature of the shock and vibrations caused by the rolling stock. Such measurements can be utilized in the detection of, for example, a wheel 12 that includes a flat spot or is out of round. In an embodiment, sensing device(s) 35 and the corresponding electronics can be built into housing 22. Still further, housing 22 can include one or more sensing devices for detecting environmental conditions within housing 22, such as a temperature, humidity, etc.

Further, system 20 can include a set of additional devices 36, one or more of which can be disposed within housing 22. For example, as illustrated in FIG. 3A, the set of additional devices 36 can comprise one or more power devices 42, which can be configured to provide an appropriate amount of power at the required voltage to each component of system 20. Additionally, system 20 can include: a heating and/or cooling component 44, which can be configured to maintain an environment within housing 22 that is favorable for the operation of the various devices disposed therein and can include a heating and/or cooling device, a fan, and/or the like; a control unit 46, which is configured to perform data acquisition and control functions for sensor device(s) 30, emitting device(s) 32, and/or the set of additional devices 36 (FIG. 2).

The set of additional devices 36 also can include a data processing system 48 (e.g., a ruggedized standard computer, customized computing device, specially-designed computer hardware, and/or the like), which is configured to implement any of various processes for receiving, analyzing, storing, transmitting, and receiving data gathered by the various sensing device(s) 30. To this extent, data processing system 48 can manage the data acquired on the rolling stock using any solution. For example, data processing system 48 can store the data, transmit the data to an external computer system 40, analyze the data, and/or the like, using any solution. Additionally, data processing system 48 can manage operational data for system 20 (e.g., operating environment, internal environment of housing 22, side impact detection, etc.) using any solution. Data processing system 48 also can control the operation of heating and/or cooling component 44, control unit 46, sensing device(s) 30, emitting device(s) 32, and/or one or more additional devices 36, analyze the data received by sensing device(s) 30, receive additional data (e.g., for comparing results from multiple housings 22/systems)/operating instructions from computer system 40 and/or another data processing system 48, and/or the like, using any solution. Computer system 40 can perform additional data processing and/or storage functions, operational functions, and/or the like, which can be used for maintenance, safety, security, and/or the like, purposes. Further, computer system 20 can manage a knowledge base of data collected by one or more housings 22, which computer system 20 can process to provide a more global analysis of the effects of various operating conditions on rolling stock and the components thereof.

One or more devices and/or components for system 20 can be located apart from housing 22 (e.g., further away from rail 4A. To this extent, a conduit 50 can be attached to an end of housing 22. Conduit 50 can comprise a flexible conduit, which can house and protect electrical cabling to deliver power to one or more devices in housing 22, communications cabling to communicate data to/from one or more devices in housing 22, and/or the like. Further, conduit 50 can carry warmed or cooled air from a remote heating and/or cooling component 44 to pass through housing 42. Still further, data and/or control information can be transmitted between computer system 40, data processing system 48, and/or another data processing system 48 via cabling (twisted pair, Ethernet, fiber optic, etc.) disposed within conduit 50. Alternatively, the communications may be wireless, e.g., through radio or laser or other non-wired communication means.

To keep snow, rain, and other lightweight debris (e.g., dust) away from bay 24A, system 20 can comprise an air curtain or blower component 52. As illustrated in FIGS. 3A-B, blower component 52 can be installed on a tie 6 that is adjacent to housing 22, but should be configured in such a manner as to not interfere with the standard maintenance of tie 6. In operation, blower component 52 can create an air curtain across the front of bay 24A to prevent dust and other debris from entering bay 24A through an opening, e.g., as rolling stock is passing along rail 4A. Further, blower component 52 can blow warmed air across the front of bay 24A to prevent snow, ice, condensation, and/or the like from interfering with the operation of sensing device(s) 30 and/or emitting device(s) 32. Alternatively, blower component 52 could provide air through conduit 50, in which case the air could blow out from an opening in bay 24A.

The sensor device(s) 30 and/or emitting device(s) 32 placed in housing 22 can be aligned and configured to acquire various types of data, which can be used to evaluate various aspects of component(s) of the rolling stock. For example, in an embodiment, housing 22 can include sensor device(s) 30 and/or emitting device(s) 32 that are configured to measure a diameter of a wheel 12. To this extent, FIGS. 5A-B show side and front views of illustrative alternative configurations for measuring a diameter of a wheel 12 according to embodiments of the invention.

In FIG. 5A, a pair of emitting devices 32A-B are placed in housing 22 and each is configured to emit radiation through an opening on a bay 24 that illuminates a portion of tread surface of wheel 12 on either side of a vertical centerline of wheel 12 with at least one line. Each emitting device 32A-B can comprise, for example, a laser line emitting device, although other types of electromagnetic radiation can be utilized. An imaging device 30, such as a wide-field camera, is placed in housing 22 and is configured to have a field of view that includes both of the illuminated portions of the tread surface of wheel 12. As wheel 12 passes along rail 14 above imaging device 30, imaging device 30 can capture a set of images of wheel 12 as it is illuminated by emitting devices 32A-B.

Subsequently, a computing device, such as data processing system 48 (FIG. 3A), can process the image(s) and use a known geometry of emitting devices 32A-B with respect to imaging device 30 to reconstruct the illuminated portions of tread surface of wheel 12 using any solution. Data processing system 48 can fit the two curves to a circle, the diameter of which will correspond to the diameter of wheel 12. In an alternative embodiment, multiple imaging devices 30, such as narrow-field cameras, could be used, each of which images one of the illuminated portions of the tread surface of wheel 12. In this case, while the images could comprise a higher resolution than those captured by the wide-field camera (thereby providing a lower margin of error), additional calibration of both of the imaging devices 30 to a common frame of reference is required.

In FIG. 5B, a single line emitting device 32C is placed in housing 22 and configured to illuminate a portion of the tread surface of wheel 12 with multiple lines of light that can be imaged by a single imaging device 30 having a narrow-field of view. A computing device, such as data processing system 48, can estimate a diameter of wheel 12 by calculating the diameter of a circle including each line and averaging the results. By averaging the results, error can be reduced and a value that is more likely representative of the "tape line" of wheel 12, which is assumed to exist at the center of the tread surface, can be obtained. In general, the diameter of a rail wheel 12 will vary noticeably between the outer and inner edges of the tread surface. The "tape line" is the standard line for measuring the diameter of wheel 12. It is understood that these embodiments are only illustrative. For example, in FIG. 5B, multiple line emitting devices 32C could be utilized, more than two lines could be utilized, multiple lines on both sides of wheel 12 can be generated and imaged, and/or the like. Further, while not shown for clarity, it is understood that housing 22 can include one or more additional components/devices as shown and described herein.

Figure 6:
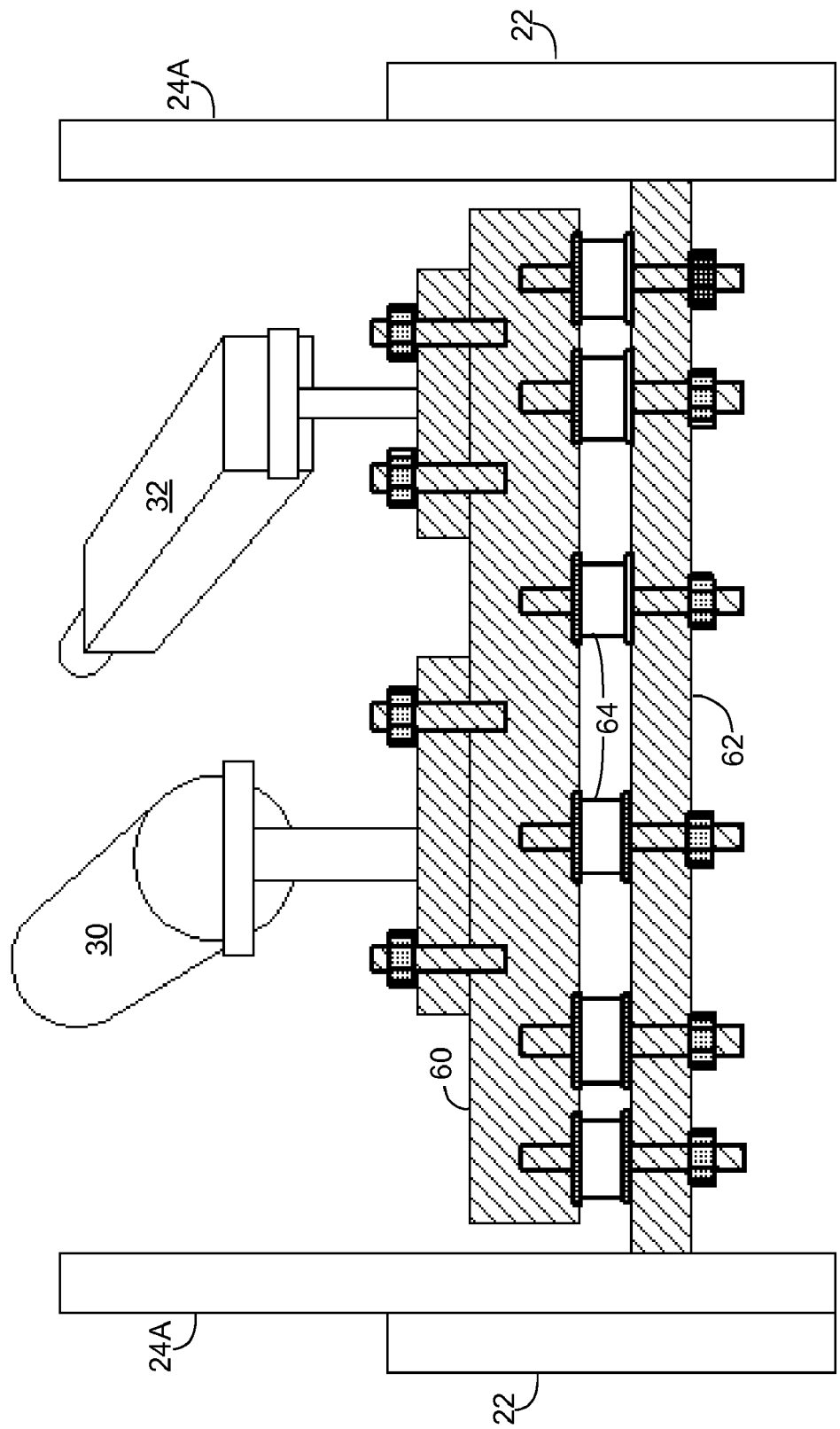
FIG. 6 shows an illustrative solution for attaching devices to the housing according to an embodiment.

It is understood that the various devices shown and described herein can be attached to housing 22 and/or bays 24A-B using any solution. When an application in which housing 22 is deployed is expected to create a substantial amount of vibration, some or all of the devices can be attached using a series of shock-absorbing connectors, which can isolate the device(s) from the majority of the vibration and shock experienced by housing 22. To this extent, FIG. 6 shows an illustrative solution for attaching devices 30, 32 to housing 22 according to an embodiment. As illustrated, devices 30, 32 are attached to a base plate 60 using any solution. Base plate 60 is attached to a mounting plate 62, which is a part of bay 24A, using a plurality of dual-ended rubber sandwich mounts 64. Sandwich mounts 64 isolate base plate 60, and therefore devices 30, 32, from mounting plate 62 and the vibrations and shock transmitted through bay 24A and housing 22 through the dual mechanisms of shock absorption and damping via the rubber, and an increased freedom of motion for base plate 60 with respect to mounting plate 62. It is understood that use of base plate 60 and sandwich mounts 64 is only illustrative, and various passive and/or active shock absorption solutions could be implemented in embodiments of system 20. Additionally, system 20 (e.g., data processing system 48) can process image data obtained by an imaging device 30 to remove image blur caused by the vibration using any solution.

While illustrative aspects of the invention have been shown and described in conjunction with imaging wheels 12 of rolling stock, it is understood that various components, including wheels 12, trucks 14 (FIG. 1), etc., of the rolling stock can be evaluated using system 20. For example, an infrared line sensor could be included in enclosure 22 to detect heat in each passing brake assembly. Further, system 20 can acquire data on the rolling stock in multiple sensor modalities. For example, as discussed in U.S. Patent Application Publication No. 2005/0258943, which is incorporated by reference, system 20 (e.g., data processing system 48 or computer system 40) can combine the data from multiple sources (i.e., data fusion) to evaluate the rolling stock, which may enable system 20 to obtain a greater understanding of the condition of the component being evaluated.

For example, an embodiment of system 20 can acquire both visible-light and infrared-based image data for each passing wheel 12. In this case, system 20 can determine measurements of each wheel 12 using imaging metrology, and detect hot spots on the wheel 12 using the infrared data. By combining the two modalities of data and illustrating that two anomalies are coincident (even if too small to resolve in detail using the data from either device alone), system 20 may be able to detect a smaller flat spot than would be possible using either modality alone. Similarly, data acquired by vibration sensing device 35 can be combined with infrared data acquired by a set of infrared sensors to detect a failing spring 16 (FIG. 1) or the like. In this case, the vibration data may indicate a vibration that is atypical of the normal vibrations detected, but which cannot be matched with a target detection profile (e.g., due to the particular amplitude, specific characteristics of the vibration waveform, etc.), while the infrared data may detect heating along one side of spring 16. By combining the infrared and vibration data, system 20 can detect the failing spring 16. In these and other applications, data fusion through multiple modalities is a significant innovation over the current state of the art, in which systems tend to focus on single means of detection for specific target parameters.

Returning to FIG. 2, when multiple housings 22 with identical devices are installed in sequence, system 20 can calibrate the devices in each housing using the data collected by the devices in each housing. For example, a set of known targets can be passed over the sequential housings 22, and as each target is known to be identical, the identical features as detected by the devices in each housing 22 may be used to calibrate the devices in each housing 22 to, for example, a chosen baseline in sensitivity, X-Y direction, and/or other parameters as appropriate for the specific devices in use.

Various advantages can be provided through the use of housings 22. For example, housing 22 can be installed as part of the standard support foundation for the railroad system and will not require specialized foundations. As housing 22 is designed to conform with standard tie 6 design, no additional structural analysis, calculations, or certifications would be necessary for the installation. Further, housing 22 can provide a modular design. To this extent, a housing 22 can be readily removed for maintenance or the like, and replaced with another housing 22 or a tie 6. When multiple housings 22 are implemented, the devices in the other housing 22 can continue to operate while the other housing is removed. Still further, a housing 22 can comprise two separate structures that are attached at a center. In this case, only a single structure of a housing 22 would need to be removed and replaced to perform maintenance on the devices placed therein.

While shown and described herein as a method and system for performing wayside inspection of rolling stock, it is understood that aspects of the invention further provide various alternative embodiments. For example, the invention provides a method of generating a system for performing wayside inspection of rolling stock. In this case, a wayside inspection system, such as system 20 (FIG. 2), can be obtained (e.g., created, maintained, made available, etc.) and one or more modules for performing a process described herein can be obtained (e.g., created, purchased, used, modified, etc.) and deployed to the system. To this extent, the deployment can comprise one or more of: (1) installing program code on a computing device from a computer-readable medium; (2) adding one or more computing and/or I/O devices to the system; and (3) incorporating and/or modifying the system to enable it to perform a process described herein.

Further, it is understood that alternative embodiments of system 20 could be implemented to perform various types of inspection for various transportation services (e.g., aircraft maintenance and safety inspections), and/or various services within the railroad industry. For example, an embodiment of system 20 can include several housings 22 that include devices configured to perform the wheel flaw detection shown and described in U.S. Patent Application Publication No. 2003/0072001, which was previously incorporated by reference. In this case, each housing 22 can include a substantially similar combination of sensing devices 30 and emitting devices 32, and can collectively cover a track distances equal to at least one full revolution of wheel 12. System 20 can process the data collected by sensing devices 30 to resolve small differences of vertical movement on the part of a wheel 12 to detect a flat spot or the like.

In addition to or instead of evaluating a wheel 12, a housing 22 may include a set of sensing devices 30 configured to examine the undercarriage of the rolling stock, including truck 14 (FIG. 1). In this case, system 20 can use: visible imaging to determine the physical condition of the visible components; infrared imaging to detect locking brakes, failing bearings, and other mechanical problems that generate significant heat; acoustic and/or vibration data to detect vibrations indicating some form of failure of various moving parts, e.g., worn bearings; and/or the like. Still further, a housing 22 may include a set of sensing devices 30 that acquire data that enables examination of an exterior side of a rail vehicle 10 (FIG. 1) by system 20, e.g., to detect potential damage to rail vehicle 10, leakage from a tank car, obtain/verify identity of the rail vehicle 10, provide security data about rail vehicle 10, and/or the like.

In an embodiment, multiple housings 22 can be installed, each of which includes a configuration of devices that do not necessarily perform the same function. For example, a housing 22 may include devices to perform wheel 12 profiling, while another housing 22 includes devices to acquire high-resolution infrared image data for detecting hot areas on a wheel 12, truck 14, vehicle 10, and various components thereof (e.g., brakes, springs, etc.). System 20 can combine the data from the devices in both housings 22 using data fusion to produce a more detailed and potentially informative model of the current state of the rail vehicle 10. By combining data from disparate sensing modes, additional data may emerge to prominence. For example, it may be found through the use of this described approach that wheels 12 that exhibit certain wear characteristics cause additional stress, which is detectable as heating, in other components of the rail vehicle 10, such as bearings. Without the ability to easily calibrate these separate systems so as to find the equivalences in their detected phenomena, such data fusion is extremely difficult. To this extent, the current invention specifically promotes the use of multiple forms of remote examination.

System 20 can combine readings acquired by several similar configurations of devices in housings 22 to produce more accurate measurements through analysis of the data for correspondences and potential "outliers" in the data. For example, system 20 may fine that readings acquired by a set of housings 22 with identical configurations of devices, which are deployed in a train yard are affected by a change in the rolling stock's speed. System 20 can compare and average several readings acquired by devices in several sequential or spaced housings 22 to show the actual change in speed and calculate and apply an appropriate compensation factor. As another example, a housing 22 can incorporate a weight sensing device. In this case, system 20 can combine readings from a number of such housings 22 along a line to detect any loss of material in a given car, e.g., indicating a leak.

Another alternate embodiment comprises a similar system 20 whose sensing devices 30 and other devices/components are designed to examine the undercarriage of other vehicles, such as commercial vehicles (trucks). In this case, system 20 is placed in an inspection location and commercial vehicles pass over the system 20, which may use various sensing devices 30, including but not limited to infrared, visible, and ultraviolet light, acoustics, radar, and/or the like, to examine the condition of components and subsystems of the vehicle. For example, it is necessary to measure the adjustment of the brake system of commercial vehicles, and this can be done through various image processing methods, e.g., as shown and described in U.S. Patent Application Publication No. 2005/0267707, which is incorporated by reference. Such a system 20 would be able to obtain clear images of all brakes simultaneously from an undercarriage vantage point, which is difficult or impossible to achieve using human inspection techniques, thereby permitting a direct evaluation and measurement of the brake adjustment with a single brake application. In many of the embodiments and applications described herein, it is understood that constructing enclosures for sensor systems to be used in harsh environments may require the incorporation of doors, shutters, wiper systems, and other protective and/or cleaning measures to ensure proper operation without maintenance for longer periods of time.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for inspecting a component of a rail vehicle, the system comprising:
   a housing attached to a set of rails on which the rail vehicle is traveling, wherein the housing substantially conforms to standard height and load bearing requirements for a railroad tie;
   a set of sensing devices attached to the housing, each sensing device configured to acquire evaluation data on the component of the rail vehicle;
   a bay attached to a top surface of the housing, wherein the bay includes an opening facing a location of the component as the rail vehicle travels along the set of rails, and wherein at least one of the set of sensing devices acquires image data based on electromagnetic radiation that passes through the opening on the bay; and
   a computing device configured to evaluate a condition of the component using the evaluation data.

2. The system of claim 1, further comprising a mirror attached to at least one of the bay or the housing, wherein the mirror directs the electromagnetic radiation towards an imaging device in the set of sensing devices that is placed within the housing.

3. The system of claim 1, further comprising a set of emitting devices attached to the housing, wherein each emitting device is configured to emit radiation that is captured by a sensing device in the set of sensing devices.

4. The system of claim 1, wherein a sensing device in the set of sensing devices is attached to the housing means for isolating the sensing device from vibration experienced by the housing.

5. The system of claim 1, wherein the set of sensing devices includes a vibration sensing device located on the housing directly below one of the set of rails, and wherein the computing device processes data acquired by the vibration sensing device to evaluate a condition of the component of the rail vehicle.

6. A system for inspecting a component of a rail vehicle, the system comprising:
   a housing attached to a set of rails on which the rail vehicle is traveling, wherein the housing substantially conforms to standard height and load bearing requirements for a railroad tie;
   a set of sensing devices attached to the housing, each sensing device configured to acquire evaluation data on the component of the rail vehicle; and
   a computing device configured to evaluate a condition of the component using the evaluation data, wherein the set of sensing devices includes a side impact sensing device attached to a side of the housing, and wherein the computing device processes data acquired by the side impact sensing device to evaluate a condition of the component of the rail vehicle.

7. The system of claim 6, further comprising a bay attached to a top surface of the housing, wherein the bay includes an opening facing a location of the component as the rail vehicle travels along the set of rails, and wherein at least one of the set of sensing devices acquires image data based on electromagnetic radiation that passes through the opening on the bay.

8. A system for inspecting a component of a rail vehicle, the system comprising:
   a housing attached to a set of rails on which the rail vehicle is traveling, wherein the housing substantially conforms to standard height and load bearing requirements for a railroad tie;
   a set of sensing devices attached to the housing, each sensing device configured to acquire evaluation data on the component of the rail vehicle;
   a computing device configured to evaluate a condition of the component using the evaluation data;
   a second housing attached to the set of rails, wherein the second housing substantially conforms to standard height and load bearing requirements for a railroad tie; and
   an emitting device attached to the second housing, wherein the emitting device is configured to emit radiation that is captured by a sensing device in the set of sensing devices.

9. A system for acquiring evaluation data on a component of a rail vehicle, the system comprising:
   a first housing attached to a set of rails on which the rail vehicle is traveling, wherein the first housing substantially conforms to standard height and load bearing requirements for a railroad tie;
   a sensing device attached to the first housing, the sensing device configured to acquire evaluation data on the component of the rail vehicle;
   a second housing attached to the set of rails, wherein the second housing substantially conforms to standard height and load bearing requirements for a railroad tie; and
   an emitting device attached to the second housing, wherein the emitting device is configured to emit radiation that is captured by the sensing device attached to the first housing.

10. The system of claim 9, further comprising:
    a first bay attached to a top surface of the first housing, wherein the first bay includes an opening facing a location of the component as the rail vehicle travels along the set of rails, and wherein the sensing device acquires evaluation data based on radiation that passes through the opening on the first bay; and
    a second bay attached to a top surface of the second housing, wherein the second bay includes an opening facing a location of the component as the rail vehicle travels along the set of rails, and wherein the emitting device emits radiation that passes through the opening on the second bay.

11. The system of claim 10, further comprising a first mirror attached to at least one of the first bay or the first housing, wherein the first mirror directs the radiation towards the sensing device.

12. The system of claim 10, further comprising a second mirror attached to at least one of the second bay or the second housing, wherein the second mirror directs the radiation towards the component.

13. The system of claim 9, wherein the sensing device is attached to the first housing means for isolating the sensing device from vibration experienced by the first housing.

14. The system of claim 9, further comprising a computing device configured to store the evaluation data.

15. The system of claim 14, wherein the evaluation data comprises image data and wherein the computing device is further configured to process the image data to remove image blur.

16. A system for inspecting a component of a rail vehicle, the system comprising:
- a first housing attached to a set of rails on which the rail vehicle is traveling, wherein the first housing substantially conforms to standard height and load bearing requirements for a railroad tie;
- a first bay attached to a top surface of the first housing, wherein the first bay includes an opening facing a location of the component as the rail vehicle travels along the set of rails; and
- a first sensing device attached to at least one of: the first housing or the first bay using a means for isolating the first sensing device from vibration experienced by the first housing, the first sensing device configured to acquire evaluation data on the component of the rail vehicle based on radiation that passes through the opening on the first bay;
- a vibration sensing device located on the housing directly below one of the set of rails, and configured to acquire evaluation data on the component of the rail vehicle based on vibration caused by the rail vehicle; and
- a computing device configured to evaluate a condition of the component using the evaluation data acquired by the first sensing device and the vibration sensing device.

17. The system of claim 16, further comprising an emitting device, wherein the emitting device is configured to emit radiation that is captured by the first sensing device.

18. The system of claim 17, further comprising a second housing attached to the set of rails, wherein the second housing substantially conforms to standard height and load bearing requirements for a railroad tie, and wherein the emitting device is attached to the second housing.

19. The system of claim 16, further comprising a blower component configured to blow air in one of: across the opening of the first bay or through the opening of the first bay.

20. The system of claim 19, wherein the blower component is attached to a railroad tie adjacent to the housing, and wherein the blower component is configured to blow air across the opening of the first bay.

* * * * *